United States Patent
Barré et al.

(10) Patent No.: US 10,546,418 B2
(45) Date of Patent: Jan. 28, 2020

(54) VISUALIZATION OF POSITIONAL GEOSPATIAL UNCERTAINTY

(71) Applicant: The Government of the United States of America, as represented by the Secretary of the Navy, Arlington, VA (US)

(72) Inventors: Brent Barré, Metarie, LA (US); Elias Ioup, New Orleans, LA (US); John Sample, Pearl River, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 56 days.

(21) Appl. No.: 15/799,150

(22) Filed: Oct. 31, 2017

(65) Prior Publication Data

US 2019/0130640 A1 May 2, 2019

(51) Int. Cl.
*G06T 17/05* (2011.01)
*G06T 7/62* (2017.01)
(Continued)

(52) U.S. Cl.
CPC ............... *G06T 17/05* (2013.01); *G06T 7/11* (2017.01); *G06T 7/143* (2017.01); *G06T 7/62* (2017.01);
(Continued)

(58) Field of Classification Search
None
See application file for complete search history.

(56) References Cited

U.S. PATENT DOCUMENTS

| 5,801,710 A * | 9/1998 | Cok ........................ G06T 11/60 345/440 |
| 5,828,379 A * | 10/1998 | Cok ........................ G06T 11/001 345/581 |
| 2004/0217980 A1 * | 11/2004 | Radburn ................. G06F 16/51 345/672 |

OTHER PUBLICATIONS

Loup et al.; "Annotating Uncertainty in Geospatial and Environmental Data;" IEEE Internet Computing; Jan./Feb. 2015; pp. 18-27; Published by the IEEE Computer Society (Year: 2015).*

(Continued)

*Primary Examiner* — Edward Martello
(74) *Attorney, Agent, or Firm* — US Naval Research Laboratory; William P. Ladd (57) ABSTRACT

Embodiments relate to visualization of positional geospatial uncertainty. Initially, a map image request for geographic features is received from a client computing device, where the map image request includes an uncertainty type, a distribution shape, and a selected visualization technique. An uncertainty buffer pixel size is determined based on a geographic distance covered by the distribution shape. At this stage, an uncertainty buffer of the uncertainty buffer pixel size is iterated across, and uncertainty is rendered at each position along the uncertainty buffer by determining a corresponding distribution probability from a probability distribution function at a current pixel position, mapping the corresponding distribution probability to a corresponding visual value of the selected visualization technique, rendering an uncertainty feature for the corresponding distribution probability around the geographic feature at the current pixel position and according to the corresponding visual value; and advancing the current pixel position based on the uncertainty type.

19 Claims, 10 Drawing Sheets

(51) Int. Cl.
 G06T 7/143 (2017.01)
 G06T 7/11 (2017.01)
 G06T 11/00 (2006.01)
(52) U.S. Cl.
 CPC .. *G06T 11/001* (2013.01); *G06T 2207/10032* (2013.01); *G06T 2207/20076* (2013.01); *G06T 2207/30181* (2013.01)

(56) References Cited

OTHER PUBLICATIONS

Lavin et al.; "Dot-Density Shading: A Technique for Mapping Continuous Climatic Data;" Journal of Climate and Applied Meteorology, vol. 25; pp. 679-690; published by American Meteorological Society; 1986 (Year: 1986).*
Brent A. Barré; "Techniques for the Visualization of Positional Geospatial Uncertainty;" (2013). University of New Orleans Theses and Dissertations. 1720; 59 pages (Year: 2013).*
MacEachren et al.; "Visualizing Geospatial Information Uncertainty: What We Know and What We Need to Know;" Cartography and Geographic Information Science, vol. 32, No. 3, 2005, pp. 139-160 (Year: 2005).*
Kevin Mote, Fast Point-Feature Label Placement for Dynamic Visualizations, pp. 1-21, Sage Journals, 2007.
Konstantinos G. Kakoulis and Ioannis G. Tollis, Chapter 15, Labeling Algorithms, pp. 489-512, Handbook of Graph Drawing and Visualization, Jun. 24, 2013.
Barre, Brent A., "Techniques for the Visualization of Positional Geospatial Uncertainty," dated Dec. 20, 2013.

* cited by examiner

VISUALIZATION OF POSITIONAL GEOSPATIAL UNCERTAINTY

BACKGROUND

Digital map users are often unaware of positional inaccuracy in underlying map data because the information is not visualized for the user. When a map contains positional inaccuracy, the geographical coordinates of a given map feature can differ from the coordinates of that feature on the actual surface of the earth. For example, a digital map can show inaccurate shoreline locations, which can cause issues when performing ship navigation. A plotted course that passes near land on the map may pass over land in reality. In this example, a ship navigator traveling on such a course would have to notice the problem and reroute. A potential solution would be to provide the planner with a visual indication of where uncertainty lies, which could allow the planner to plan a safer route using the original map.

Digital maps can include various types of data such as, but not limited to, vector data (e.g., points, lines, areas, etc.) that include geographic coordinates representing features on the earth, imagery obtained by satellite or aircraft, and gridded data like bathymetry, which are underwater depth measurements at distance intervals. Datasets can specify accuracy requirements, which can be used to determine uncertainty. For example, a shoreline vector dataset can specify that 90% of all identifiable shoreline features be located within 500 meters circular error of their true geographic position, which is an example of positional uncertainty. In another example, imagery can specify that it should be within 250 meters of the actual geographic position at sea level, which is another example of positional uncertainty. In yet another example, a bathymetry grid can specify a mathematical formula for the depth with a 95% confidence level, which is an example of depth uncertainty.

Visualization is the process by which vector data or other data are rendered on a display. Uncertainty in the data can also be visualized; however, if too is visualized on a map simultaneously, clutter can prevent a user from locating critical information on the map. Further, users may interpret the visualization of uncertainty in unexpected ways that may mislead them.

SUMMARY

Embodiments relate to visualization of positional geospatial uncertainty. Initially, a map image request for geographic features is received from a client computing device, where the map image request includes an uncertainty type, a distribution shape, and a selected visualization technique. An uncertainty buffer pixel size is determined based on a geographic distance covered by the distribution shape. At this stage, an uncertainty buffer of the uncertainty buffer pixel size is iterated across, and uncertainty is rendered at each position along the uncertainty buffer by determining a corresponding distribution probability from a probability distribution function at a current pixel position, mapping the corresponding distribution probability to a corresponding visual value of the selected visualization technique, rendering an uncertainty feature for the corresponding distribution probability around the geographic feature at the current pixel position and according to the corresponding visual value; and advancing the current pixel position based on the uncertainty type.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Embodiments of the invention relate to techniques for effectively visualizing positional geospatial uncertainty. In many of the examples herein, the World Vector Shoreline (WVS) dataset is used because of its suitability for mission-planning purposes. The WVS dataset is focused on the positions of shorelines rather attributes or values at those positions, which facilitates the demonstration of positional uncertainty visualization. However, WVS is merely an example dataset and various other suitable datasets could be used.

WVS is provided at varying data scales with 1:250,000 being the most detailed. As the scale of the used WVS shoreline decreases, the rendered shoreline fits more coarsely to the actual shoreline. In contrast, as the scale of a dataset decreases, the uncertainty of the dataset increases. The most widespread contributor to this uncertainty is the over-zoom problem.

Vector data is typically compiled from static source maps (e.g., paper maps) of certain scales, where the scale of the vector data is determined based on the scale of its source. For example, WVS data was compiled from raster data and hard copy sources at a preferred scale of 1:250000; thus, WVS dataset also has a scale 1:250,000. In other words, the WVS approximation of shoreline geometry is acceptably accurate for viewing up to that scale. However, in geographic information systems (GISs), the user can specify any scale to view the data by zooming in or out. When a map is "zoomed", the viewing scale of the rendered map changes, but the scale of the underlying data does not. This allows the user to zoom in indefinitely past the scale of the underlying data. As the user zooms in, the data geometry is redrawn in the same manner but at higher and higher precision (i.e., finer and finer geographical coordinates on-screen), which surpasses the amount of accuracy in the underlying data.

In the case of a paper map, the user has an immutable view of the data, shown as intended. The data is shown only at a scale where its depiction is accurate, so the user can magnify the map but cannot be misled by overestimating the accuracy of the data. In contrast, the shoreline separation in a digital map looks even clearer as the user zooms in because the GIS client continues to redraw the same line visualization at exact coordinates despite the fact that the map is being rendered past the intended scale of data viewing. The zoomed in data is very misleading to users because the over-zoomed rendered shoreline is misinterpreted as the true position of the shoreline.

WVS contains no metadata for the actual representation of uncertainty, but an accuracy statement can be found on National Oceanic and Atmospheric Administration's (NOAA's) website: "requirement for this data is that 90% of all identifiable shoreline features be located within 500 meters (2.0 mm at 1:250,000) circular error of their true geographic positions with respect to the preferred datum (WGS 84)." In terms of the over-zoom problem, the data is imperfect even at the intended scale of 1:250000; however, visualizing the above error at all zoom levels accounts for this imperfection as it is magnified by the over-zoom problem. The uncertainty model described herein may be derived from the WVS statement as follows. First, the statement can be thought of as, "for any WVS data point, the real world shoreline will lie within a circle whose center is the data point and whose radius is 500 m". However, the WVS shoreline is represented as a collection of line segments, not just points; thus, the uncertainty can be compared to tracing the center of a 500 m-radius pen tip over the entire shoreline represented by these line segments. The resulting line width of 1000 m can be visualized as a buffer zone that represents a high chance (90%) that the real world shoreline lies somewhere within it.

In order to be rendered on a computer display, the distances from the model above are converted from meters to degrees and then from degrees to pixels. The distance conversion is performed as described below in response to map requests before the uncertainty visualization is drawn.

The WVS accuracy statement describes an error of 500 m for the 1:250K scale, but it does not give the error for other data scales in which digital maps can be rendered. The error distance in meters (i.e., edm) should increase proportionally as the data scale decreases, which can be reflected in the formula:

$$edm = (500/250{,}000) \times s$$

where:

$s$=data scale denominator (e.g. 250K=>1/250,000=>denominator:250,000)

Programmatically, when a map request is received for a WVS uncertainty image, the WVS scale fraction is extracted from the request and used as the input, s, in the above formula.

The number of meters in one degree of latitude or longitude depends on the latitude at which the measurement is taken. In a map display, rectangular areas anywhere on earth (i.e., any latitude) can be viewed, and the rectangle's height defines a latitude range rather than a single latitude value. To handle the range of values, the mean latitude inside the rectangle (i.e., the latitude line that divides the rectangle into a top and a bottom half) is used; thus, the mean latitude in radians is the input variable L in the formulas below. The following formulas were obtained from a National Geospatial-Intelligence Agency (NGA) webpage calculator, in a web-browser. The formulas provide the meters per degree ("mpd") in the latitude and longitude directions, respectively:

$$mpd_{lat} = m_1 + m_2 \cos(2L) + m_3 \cos(4L) + m_4 \cos(6L)$$

$$mpd_{lon} = p_1 \cos(L) + p_2 \cos(3L) + p_3 \cos(5L)$$

where latitude calculation constants:
  $m_1$=111132.92;
  $m_2$=−559.82;
  $m_3$=1.175;
  $m_4$=−0.0023;
and where longitude calculation constants:
  $p_1$=111412.84;
  $p_2$=−93.5;
  $p_3$=0.118.

A map view is basically a map image ("i") bounded by an invisible geographic rectangle ("r"). The geographic dimensions of this rectangle are specified in the map request; thus, degrees-per-pixel can be calculated by the following:

$$dpp_x = (r_{xmax} - r_{xmin})/i_{width}$$

$$dpp_y = (r_{ymax} - r_{ymin})/i_{height}$$

where
  dpp=degrees-per-pixel in the x- or y-direction of the image space,
  r=bounding rectangle defined by an x (longitude) and y (latitude) min and max, and
  i=width or height pixel dimensions of the map image.

The previous two steps can be combined to calculate meters per pixels in the x- and y-directions:

$$mpp_x = mpd_{lon} \times dpp_x,$$

$$mpp_y = mpd_{lat} \times dpp_y,$$

Which can then be used with the error in meters to determine the error distance in pixels ("edp") in the x- and y-directions of a map image:

$$edp_x = edm/mpp_x,$$

$$edp_y = edm/mpp_y.$$

The calculations above are applied to convert the error model described above with respect to the WVS dataset into an image space. Accordingly, $edp_x$ and $edp_y$ define the horizontal and vertical radii, respectively, of the error ellipse for a section of a feature in pixels.

As discussed, data producers such as NOAA sometimes provide accuracy information about their datasets. However, other datasets may have accuracy information with varying probabilities over a certain distance. Such accuracy can be described in terms of a probability distribution curve. To improve the conveyance of this accuracy information to the map user, embodiments of the invention visualize different types of probability distribution curves. These visualizations are achieved by, for example, mapping values along the curve to visual values along a buffer zone gradient.

Figure 1:
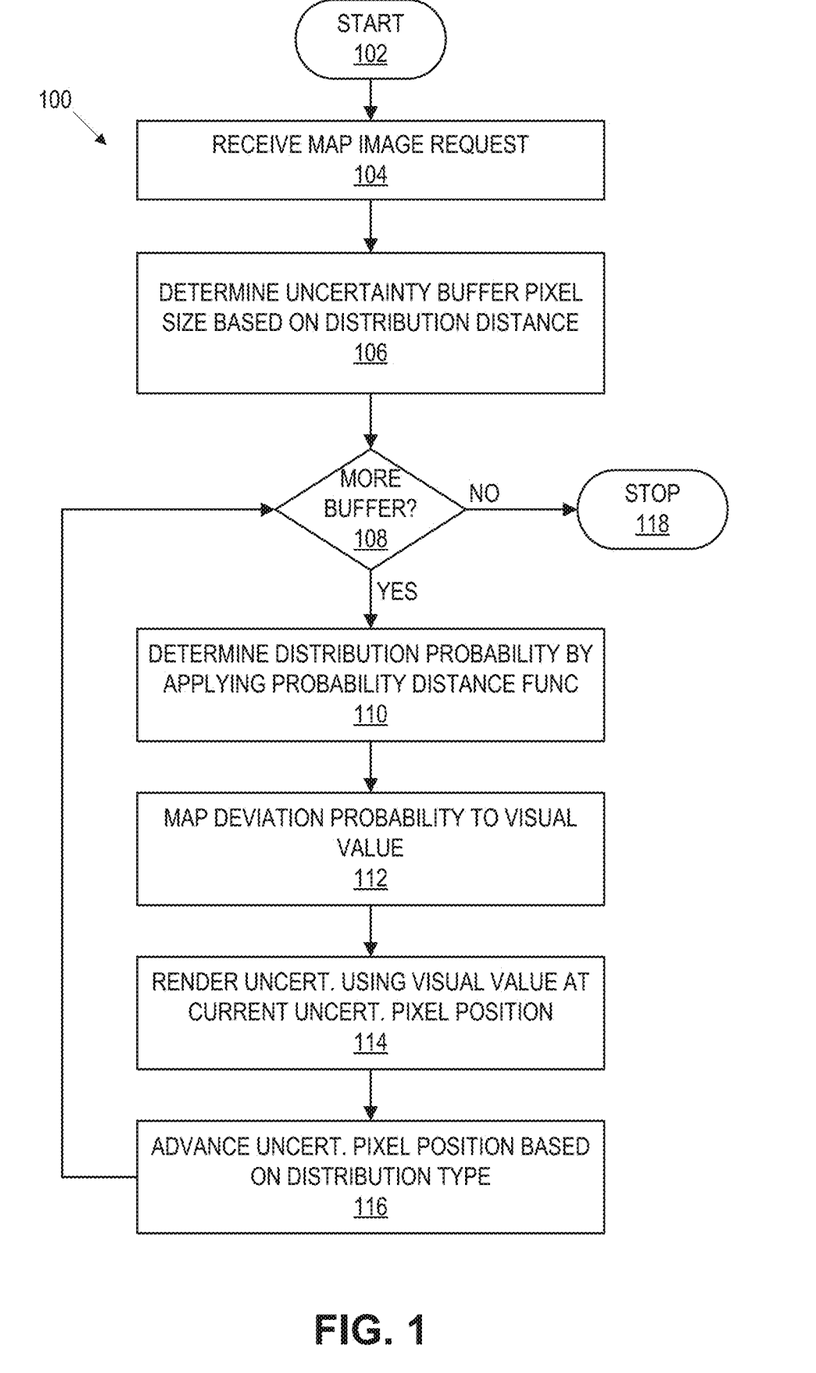
FIGS. 1-3 are example workflows for the visualization of positional geospatial uncertainty.

FIG. 1 is an example workflow 100 for the visualization of positional geospatial uncertainty. As is the case with the other processes described herein, various embodiments may not include all of the steps described below, may include additional steps, and may sequence the steps differently. Accordingly, the specific arrangement of steps shown in FIG. 1 should not be construed as limiting the scope of visualization of positional geospatial uncertainty.

In block 102, the workflow 100 starts and proceeds to block 104, where a map image request for geographic features is received. The map image request includes an uncertainty type, a distribution shape, and a selected visualization technique. Types of uncertainty include, but are not limited to, normal distributions, Cauchy distributions, discontinuous contributions, etc. The distribution shape can be defined by parameters that specify the geometric shape and size of the distribution to be drawn. Examples of selected visualizations techniques include opacity, dot density, color, quantile, etc. Examples of uncertainty types and visualizations are described below with respect to FIGS. 5B-5E.

In block 106, the uncertainty buffer pixel size is determined based on a geographic distance covered by the distribution shape. The geographic distance is in map units and is converted to pixel size as described above. In addition, an initial position for the uncertainty pixel position can be determined based on the uncertainty type. In block 108, a determination is made as to whether there is more uncertainty buffer to process. In this manner, the uncertainty buffer can be iteratively processed and then drawn by the workflow 100.

If there is more uncertainty buffer to process the workflow 100 proceeds to block 110, where a distribution probability is determined for the next pixel position of the uncertainty buffer by applying a probabilistic distribution function (e.g., normal probability distribution function, normal inverse cumulative distribution function, etc.) that corresponds to the uncertainty type. For example, a normal probability distribution function (PDF) can be sampled using the following inputs: (1) mean=0, which centers the distribution on the data line; (2) standard deviation in map image request converted to pixels; and (3) previous section width in pixels divided in half. In this example, the output of this function provides the probability that features exist at the given buffer width.

In another example, a Cauchy distribution function can be sampled using the following inputs: (1) median=0, which centers the distribution on the data line; (2) scale (size) of the Cauchy curve from the map image request; and (3) width in pixels of the previous section divided in half. The output of this function gives the probability that features exist at the given buffer width (third input).

In block 112, the distribution probability is mapped to a visual value for the selected visualization technique. For example, if the selected visualization technique is opacity, the visual value is an opacity level that corresponds to the distribution probability. In block 114, the probabilistic uncertainty is rendered using the visual value at the current pixel position. In some cases, rendering at the current pixel position corresponds to rendering the visual value up to the current pixel position from a previous position. In block 116, the pixel position is advanced based on the distribution type. Different types of uncertainty have sized sections of uncertainty buffers as described below with respect to FIGS. 5B-5E.

Workflow 100 then returns to block 108 to determine if there is more uncertainty buffer to process. If there is no remaining uncertainty buffer to process, workflow 100 proceeds to block 118 and stops. The rendered uncertainty map can be provided to the originator of the map image request. The uncertainty map can then be used for various purposes such as navigation, logistics planning, emergency response, etc.

Figure 2:
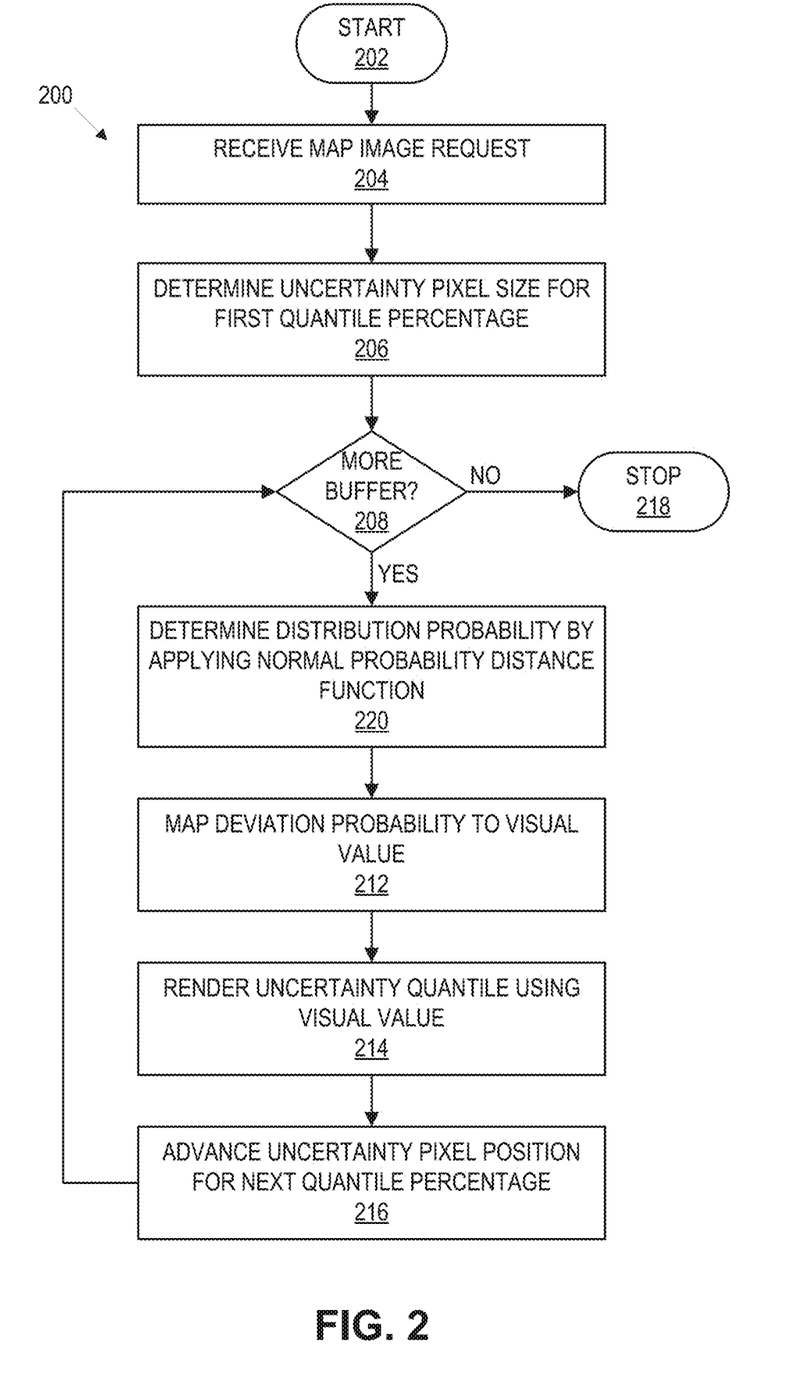

FIG. 2 is an example workflow 200 for the visualization of positional geospatial uncertainty with quantile percentages. As is the case with the other processes described herein, various embodiments may not include all of the steps described below, may include additional steps, and may sequence the steps differently. Accordingly, the specific arrangement of steps shown in FIG. 2 should not be construed as limiting the scope of visualization of positional geospatial uncertainty.

In block 202, the workflow 200 starts and proceeds to block 204, where a map image request for geographic features is received. The map image request includes an uncertainty type, a distribution shape, and a selected visualization technique. In block 206, the first quantile percentage size is determined based on the probability of the first section and the uncertainty buffer size, which in turn is determined based on a geographic distance covered by the distribution shape. Quantiles divide a distribution into sections with equal probabilities. For example, the distribution shape can be divided into three sections that contain 30%, 60%, and 90% of the uncertainty distribution, where the dataset has a 90% certainty of matching the actual geographic locations. In this example, a normal inverse cumulative distribution function ("CDF") can be used to determine the width of the first quantile.

In block 208, a determination is made as to whether there is more uncertainty buffer to process. In this manner, the uncertainty buffer can be iteratively processed and then drawn by the workflow 200. If there is more uncertainty buffer to process the workflow 200 proceeds to block 210, where a distribution probability is determined for the next pixel position of the uncertainty buffer by sampling a normal probabilistic distance function for a value near the edge of the current section. In block 212, the deviation probability is mapped to a visual value (e.g., opacity level) for the selected visualization technique. In block 214, the probabilistic uncertainty is rendered using the visual value for the current uncertainty quantile. In block 216, the pixel position is advanced for the next quantile percentage. Workflow 200 then returns to block 208 to determine if there is more uncertainty buffer to process. If there is no remaining uncertainty buffer to process, workflow 200 proceeds to block 218 and stops.

Figure 3:
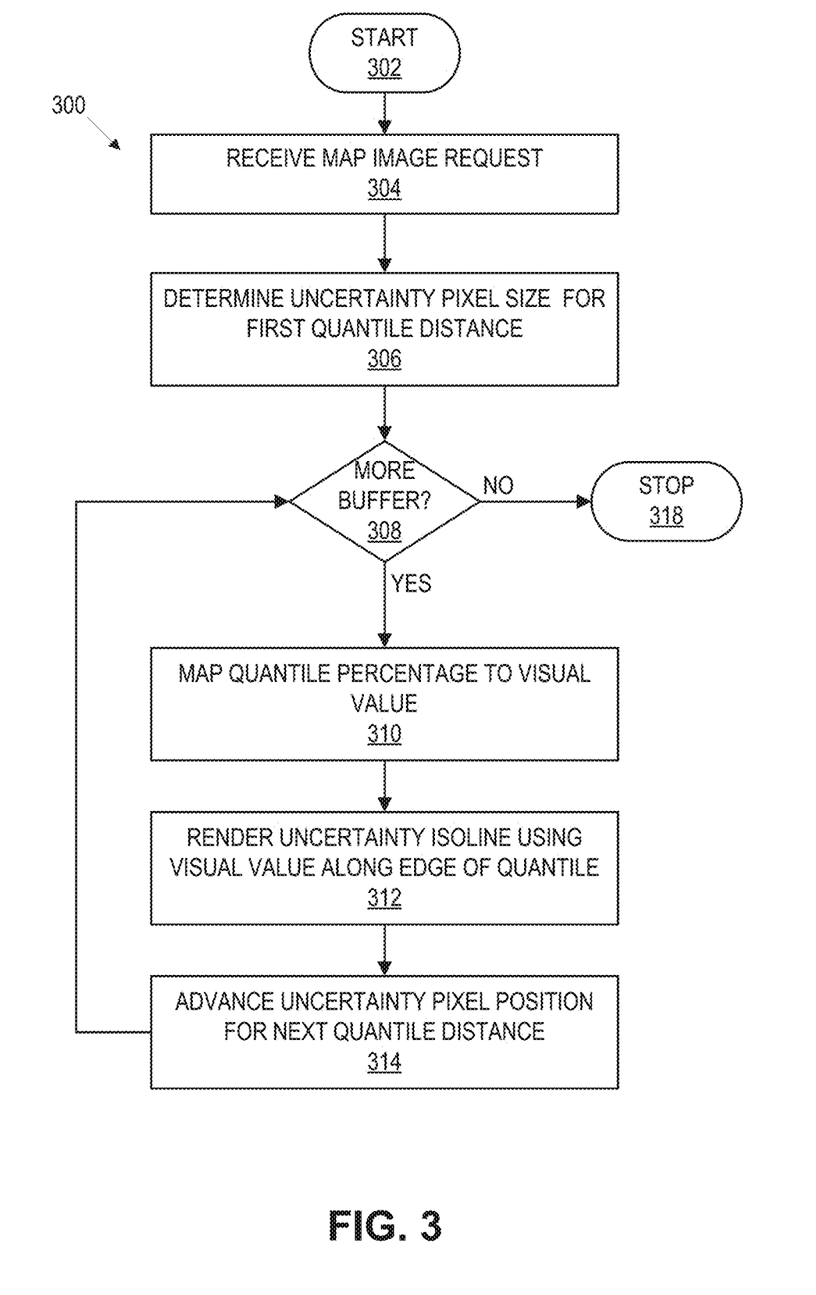

FIG. 3 is an example workflow 300 for the visualization of positional geospatial uncertainty with quantile distances. As is the case with the other processes described herein, various embodiments may not include all of the steps described below, may include additional steps, and may sequence the steps differently. Accordingly, the specific arrangement of steps shown in FIG. 3 should not be construed as limiting the scope of visualization of positional geospatial uncertainty.

In block 302, the workflow 300 starts and proceeds to block 304, where a map image request for geographic features is received. The map image request includes an uncertainty type, quantile distances, uncertainty values, and a selected visualization technique. In block 306, the first quantile distance size is determined based on the first quantile distance. For example, the map request may specify that isolines be drawn at 100, 250, and 500 meters, which correspond to 15%, 40%, and 90% of the uncertainty distribution respectively. In block 308, a determination is made as to whether there is more uncertainty buffer to process. In this manner, the uncertainty buffer can be iteratively processed and then drawn by the workflow 300.

If there is more uncertainty buffer to process the workflow 300 proceeds to block 310, where the quantile distance is mapped to a visual value (e.g., color and line thickness) for the selected visualization technique. In block 312, the corresponding uncertainty value is rendered using the visual value for the quantile distance. In block 314, the pixel position is advanced for the next quantile distance.

Workflow 300 then returns to block 308 to determine if there is more uncertainty buffer to process. If there is no remaining uncertainty buffer to process, workflow 300 proceeds to block 318 and stops.

Figure 4:
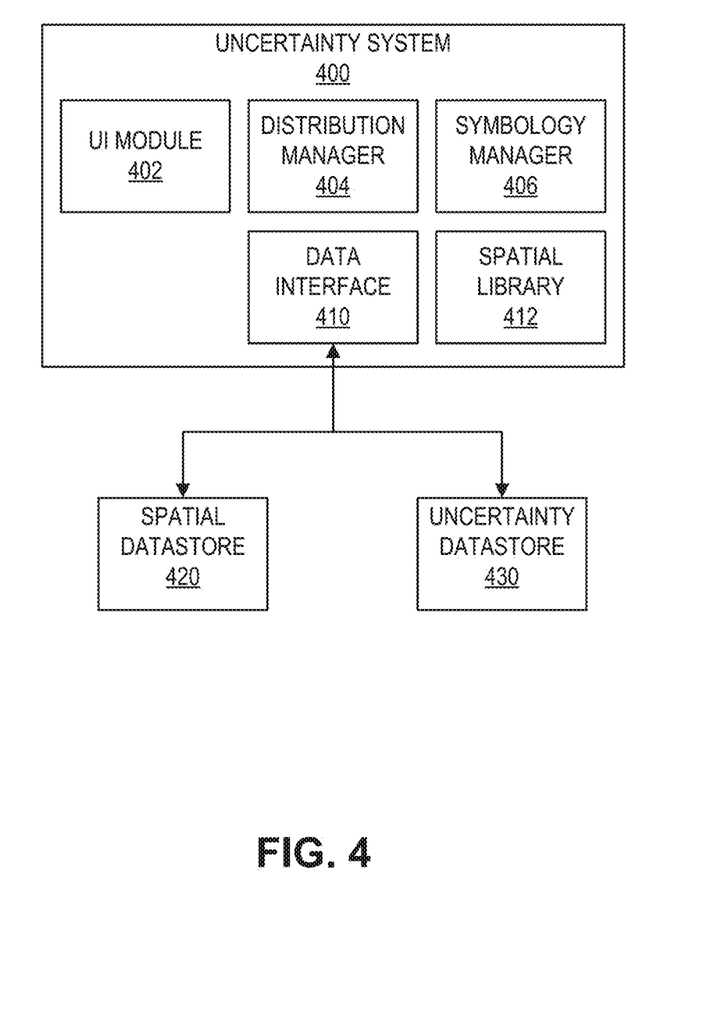
FIG. 4 is a diagram of an example system for visualization of positional geospatial uncertainty.

FIG. 4 is a diagram of an example system 400 for the visualization of positional geospatial uncertainty. The system of this example includes an uncertainty system 400, a spatial datastore 420, and an uncertainty datastore 430.

Uncertainty system 400 is configured to visualize geospatial uncertainty in response to map requests. While FIG. 4 shows two datastores, uncertainty system 400 could be connected to any number of datastores to perform visualization of positional geospatial uncertainty. Uncertainty system 400 includes a user interface (UI) module 402, a distribution manager 404, a symbology manager 406, a data interface 410, and a spatial library 412.

UI module 402 provides a user interface that allows users to interact with uncertainty system 400. For example, UI module 402 can provide a web-based map interface that allows users to generate and use GIS maps that include spatial features. In this example, the UI module 402 can allow a user to submit a map request for geospatial to be rendered on a GIS map, where the map interface receives the uncertainty type, distributions shape, etc. as parameters from the user.

Distribution manager 404 determines the size and shape of uncertainty buffers and sections of uncertainty buffers. The size and shape of the uncertainty buffer is determined by converting map distances to pixel distances as described above. In some cases, each section of the uncertainty buffer can then be determined based on the uncertainty type and the total size of the uncertainty buffer. For example, if the uncertainty type is a normal distribution, standard deviations can be used to determine the size of each section.

Distribution manager 404 also uses probabilistic functions to determine distribution probabilities for rendering uncertainty. The distribution manager 404 can receive an uncertainty type and an uncertainty position as inputs, which are used to select a probabilistic function (e.g., normal probability distribution function, normal inverse cumulative distribution function, etc.) for determining a distribution probability at the uncertainty position. Distribution manager 404 can obtain distribution functions from uncertainty datastore 430 via data interface 410.

Symbology manager 406 manages visualization techniques for rendering uncertainty. The symbology manager 406 can determine visual values for distribution probabilities, where the visual values are each associated with a visualization technique. For example, if the visualization technique is opacity, symbology manager 406 can determine an opacity level that corresponds to an input distribution probability. In another example, if the visualization technique is quantile distances, symbology manager 406 can determine a line color and width that corresponds to an input distribution probability.

Data interface 410 allows uncertainty system 400 to access spatial datastore 420 and uncertainty datastore 430. For example, data interface 410 can be datastore drivers that provide access to a datastore backend that includes spatial datastore 420 and uncertainty datastore 430. Different data source interfaces 410 can be implemented to support different types of datastores (e.g., databases, flat files, etc.). In this manner, the implementation of uncertainty system 400 is independent of the type of datastore.

Spatial library 412 is configured to perform spatial operations on data layers and geospatial features. For example, spatial library 412 can be used to identify the geospatial features in a geographic area. In another example, spatial library 412 can be used by distribution manager 404 to generate uncertainty shapes based on underlying geographic features.

Figure 5A:
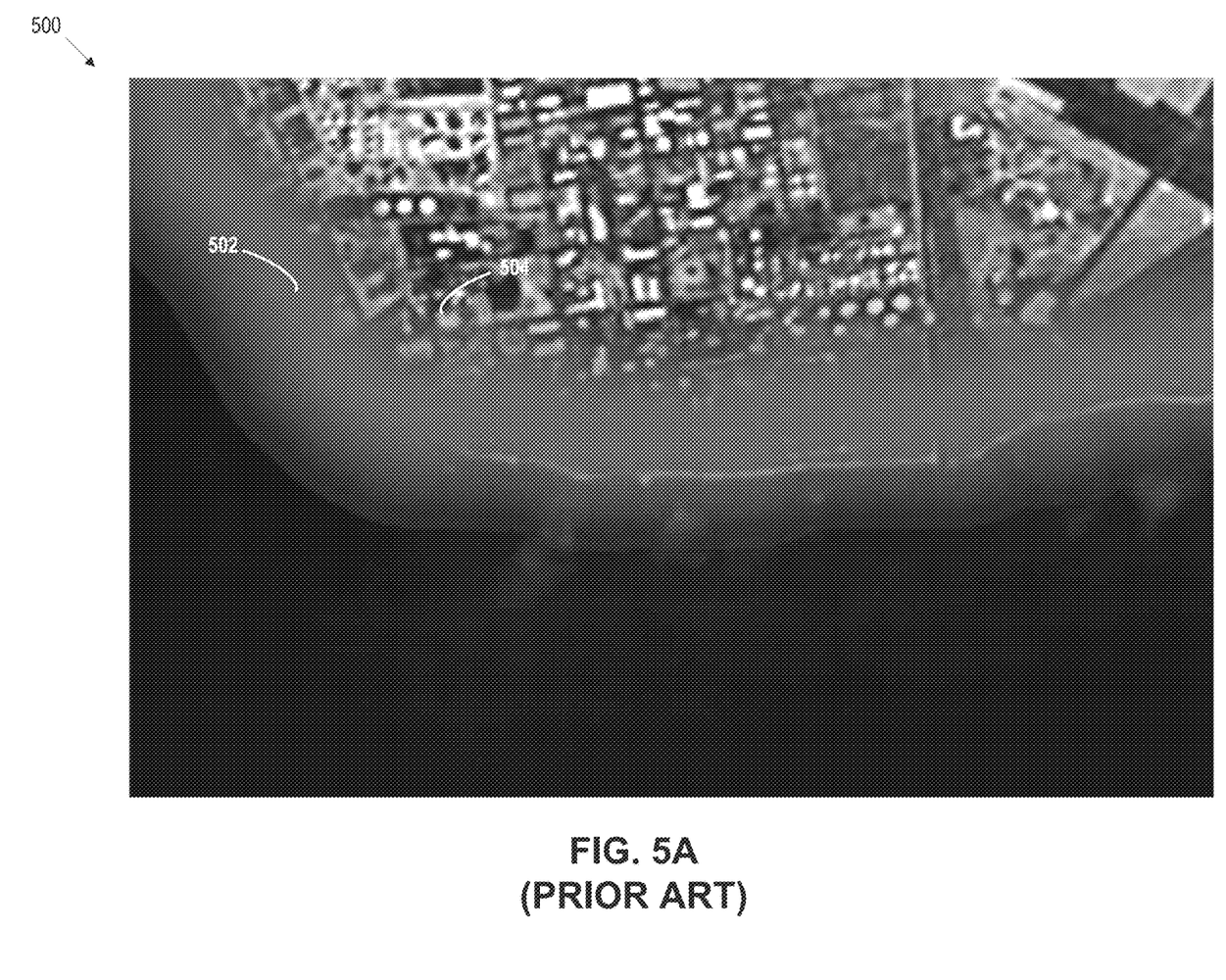
FIG. 5A is a typical visualization of uncertainty in the prior art.

FIG. 5A is a typical visualization of uncertainty 500 in the prior art. In FIG. 5A, a shoreline feature 502 is shown with an uncertainty gradient 504 that has a linear distribution. The opacity of the uncertainty gradient 504 decreases by a constant amount for each pixel that extends out from the shoreline feature 502. The linear distribution of the uncertainty gradient 504 can be misleading to a user because it overemphasizes the certainty of the underlying data.

Figure 5B:
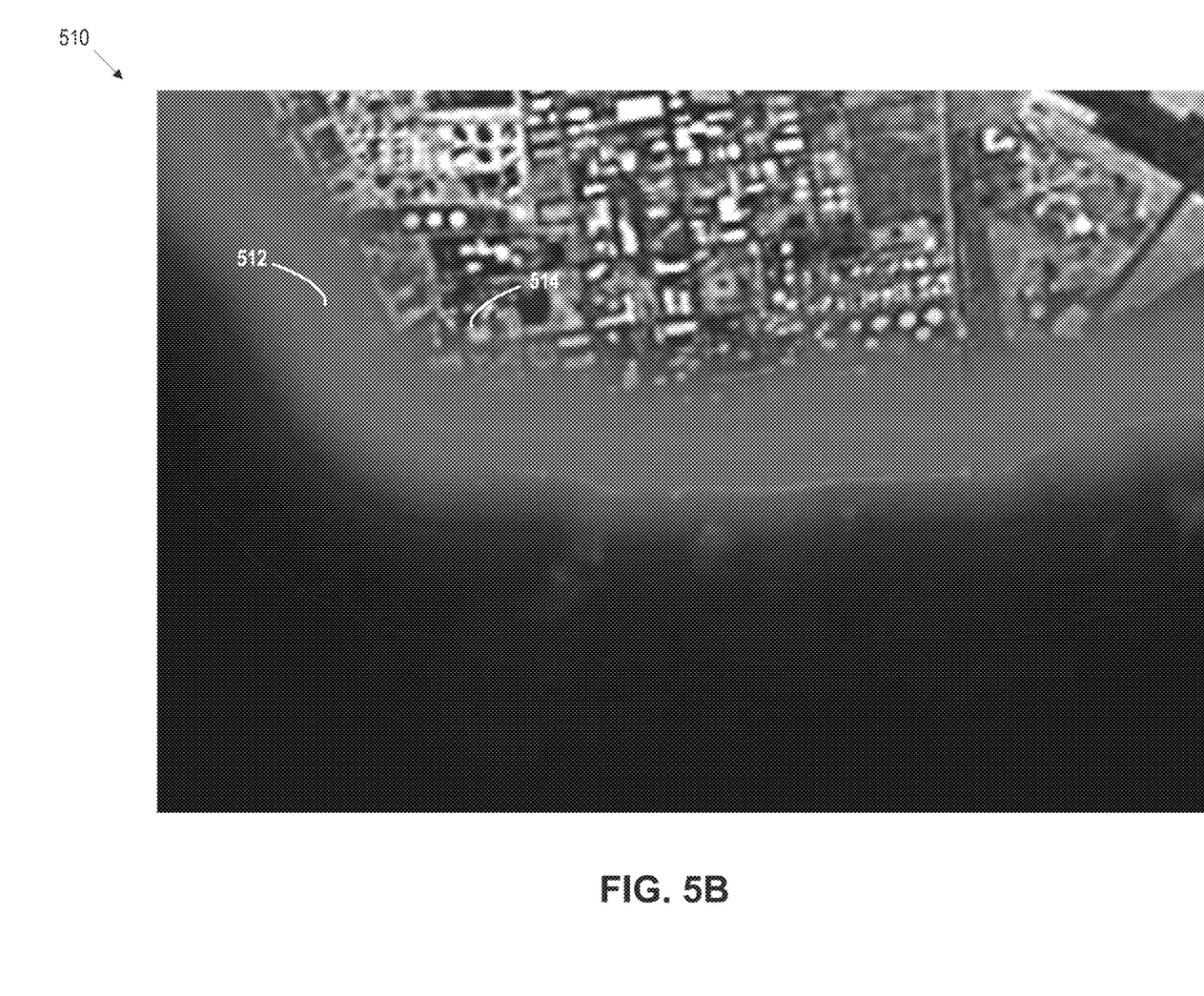
FIGS. 5B-5E are example visualizations of positional geospatial uncertainty in accordance with one or more embodiments of the invention.

FIG. 5B is an example visualization 510 of positional geospatial uncertainty with a normal distribution. Unlike the uncertainty gradient 504 of FIG. 5A, uncertainty gradient 514 is capable of representing statistical information (i.e., uncertainty probability distributions) across the buffer of the shoreline feature 512. In this example, the standard deviation of 300 m is provided as a parameter to an uncertainty system, which is capable of visualizing uncertainty given as a normal distribution with any standard deviation. Unlike FIG. 5A, uncertainty gradient 504 more accurately reflects the uncertainty of shoreline feature 512 by distributing higher opacity value further into the buffer.

Figure 5C:
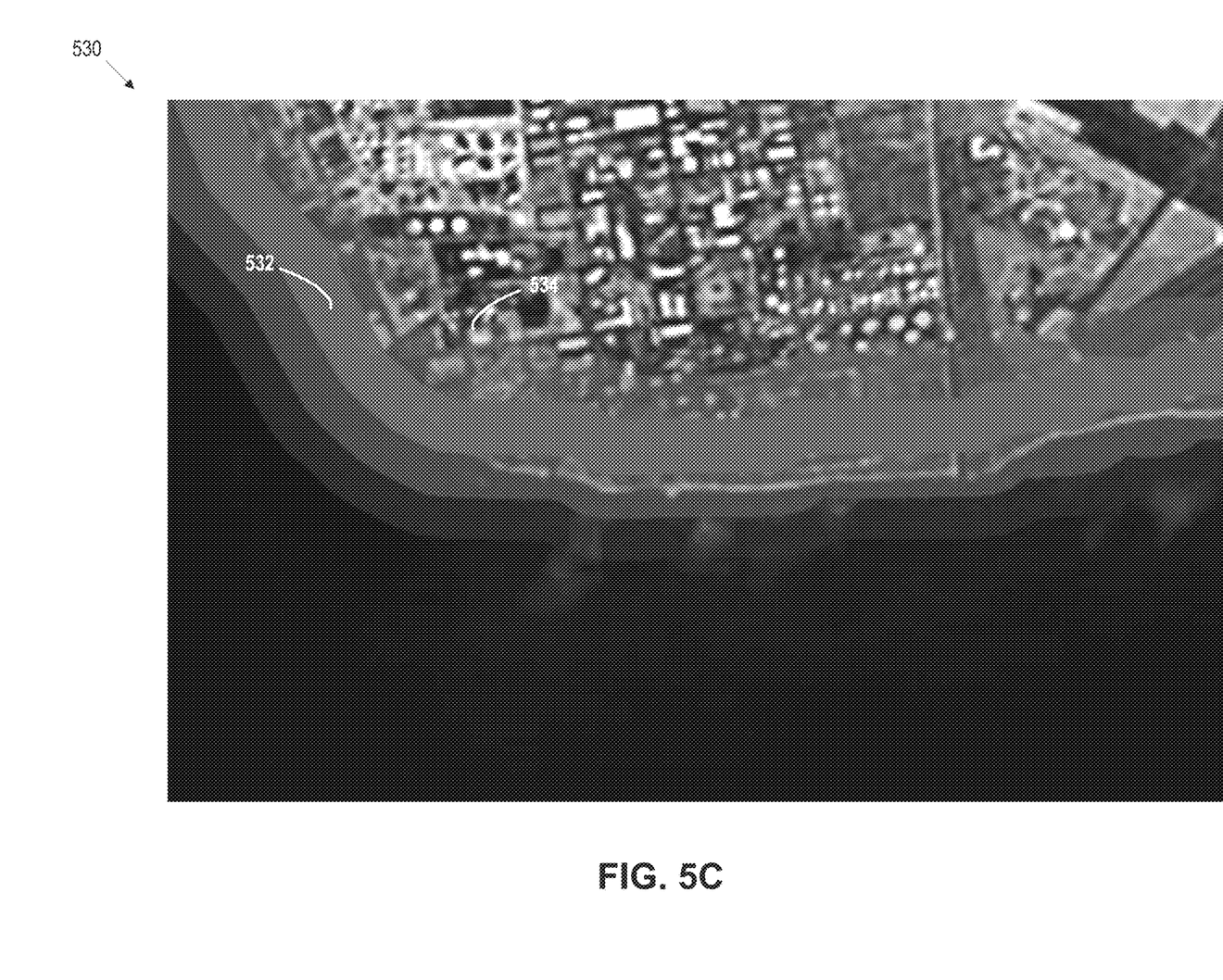

FIG. 5C is an example visualization 530 of positional geospatial uncertainty that is divided into quantile intervals. In this example, a normal distribution of the uncertainty for a shoreline feature 532 is divided into quantile intervals. Specifically, 30% of the uncertainty distribution 534 is within the thinnest, most-opaque line, 70% is within the wider, less opaque line, and 90% is within the widest, least opaque line. The opacity for each line can be obtained by sampling the distribution's probability at the line's outer edge.

Figure 5D:
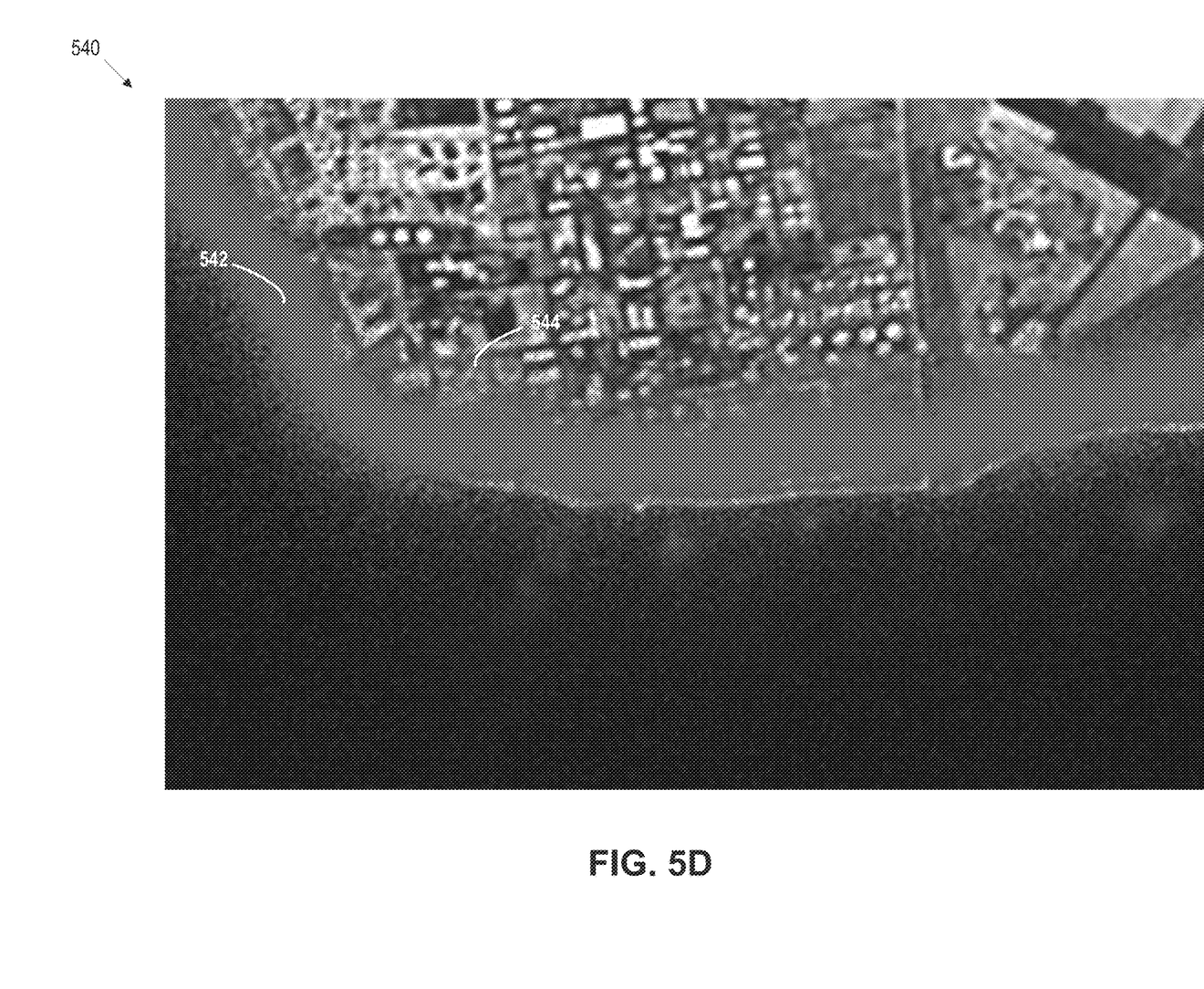

FIG. 5D is an example visualization 540 of positional geospatial uncertainty of a Cauchy distribution. Cauchy distributions are characterized by a steeper drop off from the peak value that continues into a much more gradual drop off. The uncertainty dot density rendering 544 shows a thinner area of high density in the center near the shoreline feature 542 and a continuation of sparser dots all the way to the bounds of the buffer.

Figure 5E:
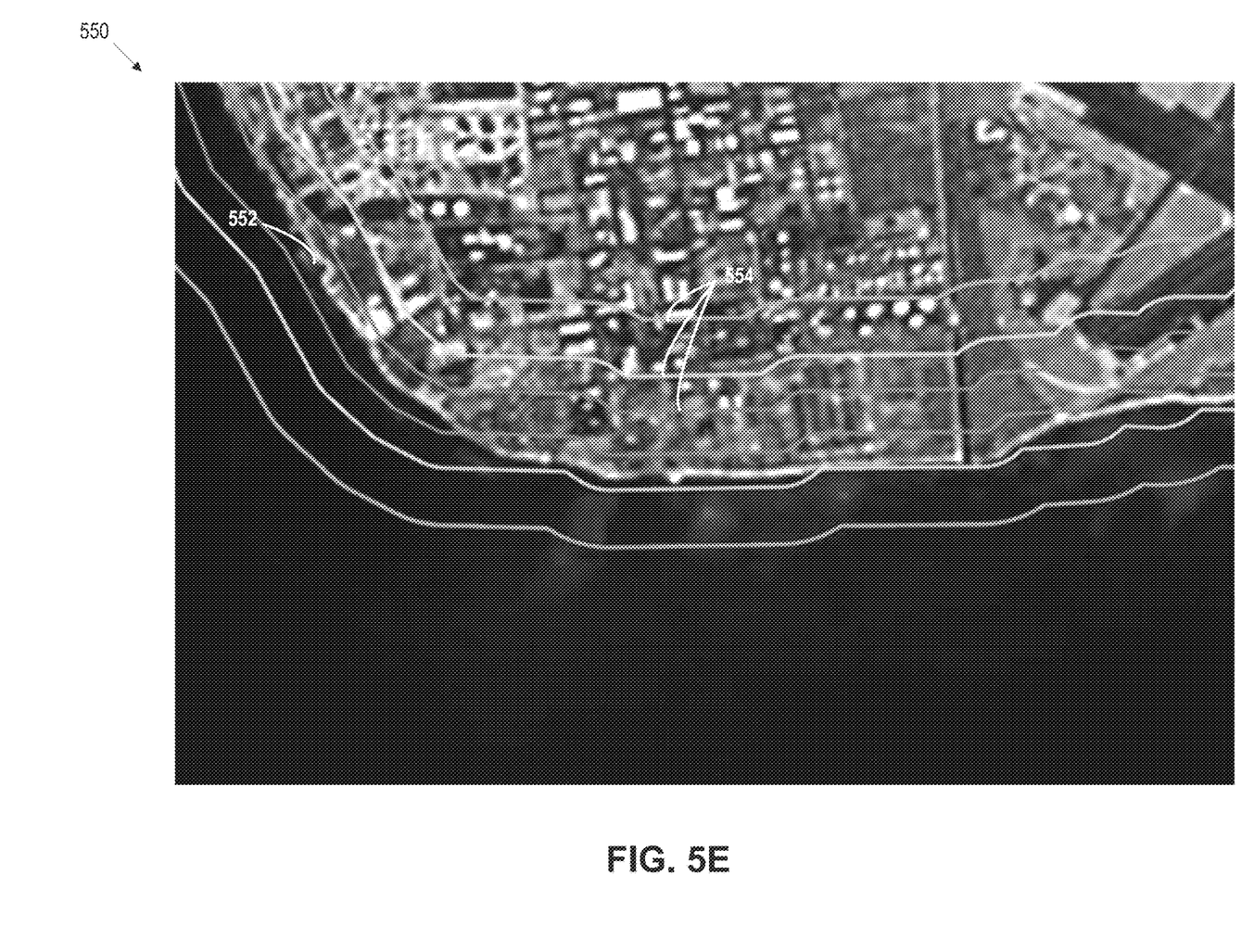

FIG. 5E is an example visualization 550 of positional geospatial uncertainty of a discontinuous distribution. In this example, quantiles 554 specified by a user are rendered as isolines using visual values. The uncertainty quantiles 554 convey that 15% of shoreline data features 552 are within 100 m of their true geographical positions, 40% are within 250 m, and 90% are within 500 m. The given percentages are mapped to a shade of color from red (0%) to green (100%).

Figure 6:
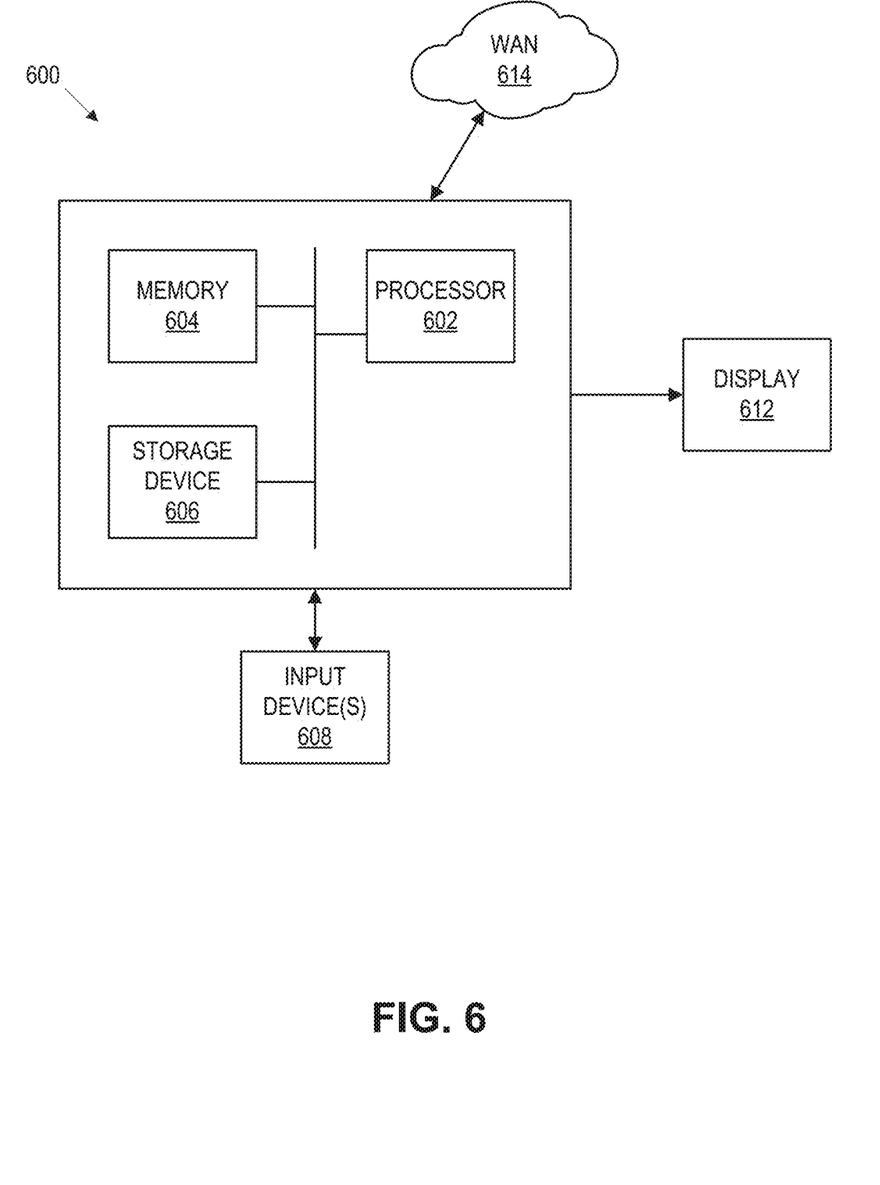
FIG. 6 is a diagram of an example computer system for executing a system for visualization of positional geospatial uncertainty.

The invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention (e.g., distribution manager, spatial library, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for visualizing positional geospatial uncertainty, comprising:
   receiving a map image request for geographic features from a client computing device, wherein the map image request comprises an uncertainty type, a distribution shape, a search area, and a selected visualization technique;
   dividing the distribution shape into a plurality of quantiles having equal probabilities;
   determining an uncertainty buffer pixel size for a first quantile in the plurality of quantiles based on a geographic distance covered by the distribution shape; and
   iterating across an uncertainty buffer of the uncertainty buffer pixel size and rendering uncertainty at each position along the uncertainty buffer by:
      a) determining a corresponding distribution probability by sampling a probability distribution function using a current pixel position in the uncertainty buffer, wherein the probability distribution function is associated with the uncertainty type;
      b) mapping the corresponding distribution probability to a corresponding visual value of the selected visualization technique;
      c) rendering an uncertainty feature for the corresponding distribution probability around the geographic feature at the current pixel position and according to the corresponding visual value;
      d) advancing the current pixel position for a subsequent quantile in the plurality of quantiles based on the uncertainty type; and
      e) repeating steps (a)-(d) with the advanced buffer pixel position if there are additional positions along the uncertainty buffer to process.

2. The method of claim 1, wherein the probability distribution function is a normal probability distribution function, wherein the map image request further comprises a mean and a standard deviation, and wherein the method further comprises:
   converting the standard deviation to pixels; and
   determining the corresponding distribution based on the converted standard deviation and the mean.

3. The method of claim 1, wherein the probability distribution function is a Cauchy probability distribution function, wherein the map image request further comprises a median and a scale of a Cauchy curve, and wherein the method further comprises:
   determining the corresponding distribution based on the scale of the Cauchy curve and the median.

4. The method of claim 1, wherein the probability distribution function is a discontinuous probability distribution function.

5. The method of claim 1, wherein the selected visualization technique is an opacity gradient, and wherein each of the uncertainty features is rendered with an opacity that correlates to the corresponding distribution probability.

6. The method of claim 1, wherein the selected visualization technique is a dot density gradient, and wherein each of the uncertainty features is rendered with a dot density that correlates to the corresponding distribution probability.

7. The method of claim 1, wherein the distribution shape specifies a geographic shape and a size of a distribution to be drawn.

8. The method of claim 1, wherein determining the uncertainty buffer pixel size further comprises:
   determining the uncertainty buffer pixel size based on a geographic distance covered by the distribution shape.

9. The method of claim 1, further comprising:
   determining an initial position for the uncertainty pixel position based on the uncertainty type.

10. The method of claim 1, further comprising:
    converting the geographic distance from map units to a pixel size.

11. The method of claim 1, wherein the map image request further comprises a plurality of quantile distances, and wherein dividing the distribution shape into a plurality of quantiles having equal probabilities further comprises:
    dividing the distribution shape into the plurality of quantiles having equal probabilities based on the received quantile distances.

12. A system comprising:
    a spatial datastore to store geographic features; and
    a computer processor to execute:
       a user interface module to receive a map image request for the geographic features from a client computing device, wherein the map image request comprises an uncertainty type, a distribution shape, a search area, and a selected visualization technique; and
       a distribution manager to:
          divide the distribution shape into a plurality of quantiles having equal probabilities;
          determine an uncertainty buffer pixel size for a first quantile in the plurality of quantiles based on a geographic distance covered by the distribution shape; and
          iterate across an uncertainty buffer of the uncertainty buffer pixel size and rendering uncertainty at each position along the uncertainty buffer by:
             a) determining a corresponding distribution probability by sampling a probability distribution function using a current pixel position in the uncertainty buffer, wherein the probability distribution function is associated with the uncertainty type;
             b) mapping the corresponding distribution probability to a corresponding visual value of the selected visualization technique;
             c) rendering an uncertainty feature for the corresponding distribution probability around the geographic feature at the current pixel position and according to the corresponding visual value;
             d) advancing the current pixel position for a subsequent quantile in the plurality of quantiles based on the uncertainty type; and
             e) repeating steps (a) (d) with the advanced buffer pixel position if there are additional positions along the uncertainty buffer to process.

13. The system of claim 12, wherein the probability distribution function is a normal probability distribution function.

14. The system of claim 12, wherein the probability distribution function is a Cauchy probability distribution function.

15. The system of claim 12, wherein the probability distribution function is a discontinuous probability distribution function.

16. The system of claim 12, wherein the selected visualization technique is an opacity gradient, and wherein each of the uncertainty features is rendered with an opacity that correlates to the corresponding distribution probability.

17. The system of claim 12, wherein the selected visualization technique is a dot density gradient, and wherein each of the uncertainty features is rendered with a dot density that correlates to the corresponding distribution probability.

18. The system of claim 12, wherein the probability distribution function is a discontinuous distribution function, and wherein each of the uncertainty features is rendered using an isoline that correlates to the corresponding distribution probability.

19. A method for visualizing positional geospatial uncertainty, comprising:
   receiving a map image request for geographic features from a client computing device, wherein the map image request comprises a search area;
   dividing a discontinuous distribution into a plurality of quantiles having equal probabilities;
   determining an uncertainty buffer pixel size for a first quantile in the plurality of quantiles; and
   iterating across an uncertainty buffer of the uncertainty buffer pixel size and rendering uncertainty at each position along the uncertainty buffer by:
   a) determining a corresponding distribution probability by sampling a discontinuous distribution function using a current pixel position in the uncertainty buffer;
   b) mapping the corresponding distribution probability to a corresponding isoline in a plurality of isolines;
   c) rendering an uncertainty feature for the corresponding distribution probability around the geographic feature at the current pixel position and according to the corresponding isoline;
   d) advancing the current pixel position for a subsequent quantile in the plurality of quantiles; and
   e) repeating steps (a)-(d) with the advanced buffer pixel position if there are additional positions along the uncertainty buffer to process.

* * * * *